J. O. AASE.
POTATO DIGGER.
APPLICATION FILED SEPT. 17, 1912.

1,070,384.

Patented Aug. 19, 1913.

WITNESSES:
A. E. Carlsen.
E. C. Carlsen.

INVENTOR:
John O. Aase.
BY his ATTORNEY:
A. M. Carlsen

COLUMBIA PLANOGRAPH CO., WASHINGTON, D. C.

UNITED STATES PATENT OFFICE.

JOHN O. AASE, OF TURTLE LAKE, WISCONSIN.

POTATO-DIGGER.

1,070,384.  Specification of Letters Patent.  Patented Aug. 19, 1913.

Application filed September 17, 1912. Serial No. 720,747.

*To all whom it may concern:*

Be it known that I, JOHN O. AASE, a citizen of the United States, residing at Turtle Lake, in the county of Barron and State of Wisconsin, have invented a new and useful Potato-Digger, of which the following is a specification.

My invention relates to potato diggers of the kind drawn by horses or other power; and the object is to provide an inexpensive yet efficient device of said kind for digging potatoes and separating them from the soil.

Figure 1:
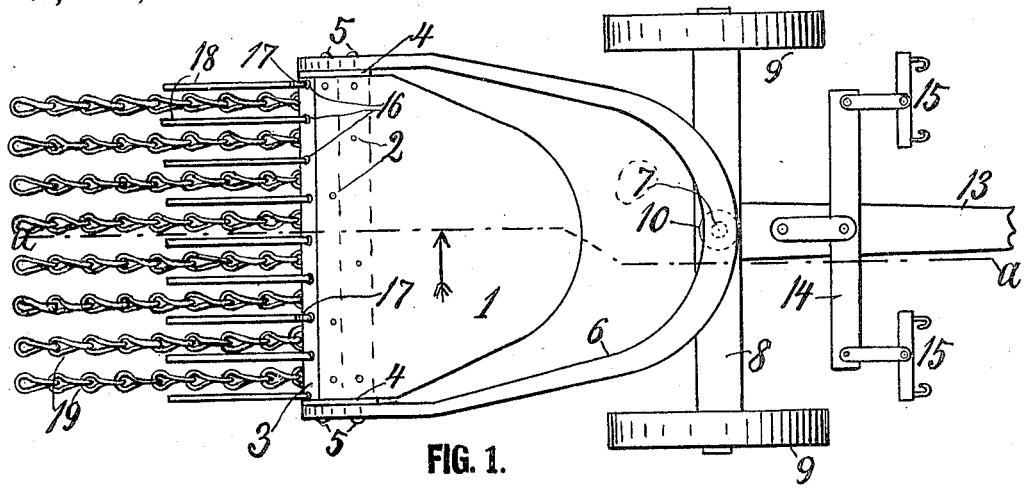
Figure 2:
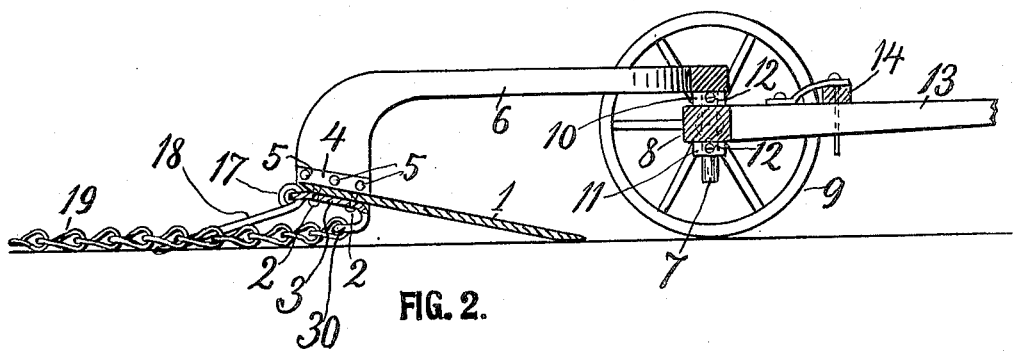

In the accompanying drawing, Figure 1 is a top view of my improved potato digger with draft appliance attached to it, Fig. 2 is a longitudinal vertical section on the line *a—a* Fig. 1.

Referring to the drawing by reference numerals, 1 designates the share or shovel of the digger which may be of variously modified shapes. The rear end of the shovel is secured at 2 upon a cross bar 3, whose angular ends 4 are secured at 5 to the rear ends of a U-shaped beam 6, the front bend of which has a fixed stud 7 inserted downwardly into a central hole in an axle 8, whose ends are supported by two carrier wheels 9.

10 and 11 are collars provided with set screws 12 by which the collars may be regulated up or down on the stem 7 and thereby tilt the beam 6 so as to make the shovel go the desired depth in the ground.

From the middle of the axle extends forwardly a pole 13, upon which is provided a swingle-tree 14 and double-trees 15 when the machine is to be drawn by draft animals. The upper and rearmost edge of the flat bar 3 is provided with a series of holes 16 in each of which is attached the eye-shaped front end 17, (see Fig. 2) of a bar 18 whose rear end drags on the ground.

19 are drag chains about twice as long as the bars 18. These chains have their front ends attached in holes in the foremost but downwardly and rearwardly curved edge 20 of the bar 3, so that one chain operates between each pair of drag bars. The links of said chains are twisted as indicated in the drawing.

In the operation, if the device is drawn by animals one animal is hitched to each of the whiffletrees 15 so as to walk one at each side of the ridge of soil containing a row of potato stands. As the device is then drawn forward the shovel 1 scoops up the row of dirt and potatoes and as the same passes rearward over the shovel and drops upon the bars 18, the soil is thereby broken up, and as the machine keeps on moving forward the bars 18 and the chains, especially the chains, further pulverize the soil and separate the potatoes therefrom. In this action the twisted form of the links of the chains has a wonderful effect, in that each link acts almost like the mold board of a plow, turning, besides dragging and stirring the soil and potatoes until the potatoes are completely separated and ready to be picked or shoveled from the ground and removed.

What I claim is:

1. In a potato-digger, a beam, means for supporting the front end of the beam and draft appliances attached thereto, a shovel secured to the rear end of the beam, a cross bar fixed underneath the rear end of the shovel, a series of spaced drag chains attached to said cross bar and a series of drag bars pivotally attached to the cross bar alternately between the chains.

2. In a potato digger, a beam, means for supporting the front end of the beam and draft appliances attached thereto, a shovel secured to the rear end of the beam, a cross bar V-shaped in cross section fixed underneath the rear end of the shovel with its groove turned rearwardly, a series of spaced drag chains attached to said cross bar below the groove and a series of drag bars pivotally attached to the cross bar above the groove alternately between the chains, said drag bars being shorter than the chains.

3. In a potato digger, a beam, means for supporting the front end of the beam and draft appliances attached thereto, a shovel secured to the rear end of the beam, a cross bar fixed underneath the rear end of the shovel, a series of spaced drag chains attached to said cross bar and a series of drag bars pivotally attached to the cross bar alternately between the chains, said drag bars being shorter than the chains, and attached to the cross bar higher up and rearwardly of the points at which the chains are fastened.

4. In a potato digger, a beam, means for supporting the front end of the beam and draft appliances attached thereto, a shovel secured to the rear end of the beam, a cross bar fixed underneath the rear end of the shovel and presenting a higher and a lower rearward edge, a series of spaced drag chains attached to said lower edge and a series of drag bars pivotally attached to the upper edge of the cross bar alternately between the chains.

5. In a potato digger, a beam, means for supporting the front end of the beam, and draft appliances attached thereto, a shovel secured to the rear end of the beam, a cross bar fixed underneath the rear end of the shovel, a series of spaced drag chains attached to said cross bar and a series of drag bars attached to the cross bar alternately between the chains, said chains having their links of twisted form.

In testimony whereof I affix my signature, in presence of two witnesses.

JOHN O. AASE.

Witnesses:
   CHAS. J. ANDERSON,
   A. L. BRITSCH.